Nov. 16, 1937. G. E. STEVENS Re. 20,556
PROCESS FOR TREATING MASSECUITE
Original Filed May 12, 1934 2 Sheets-Sheet 1
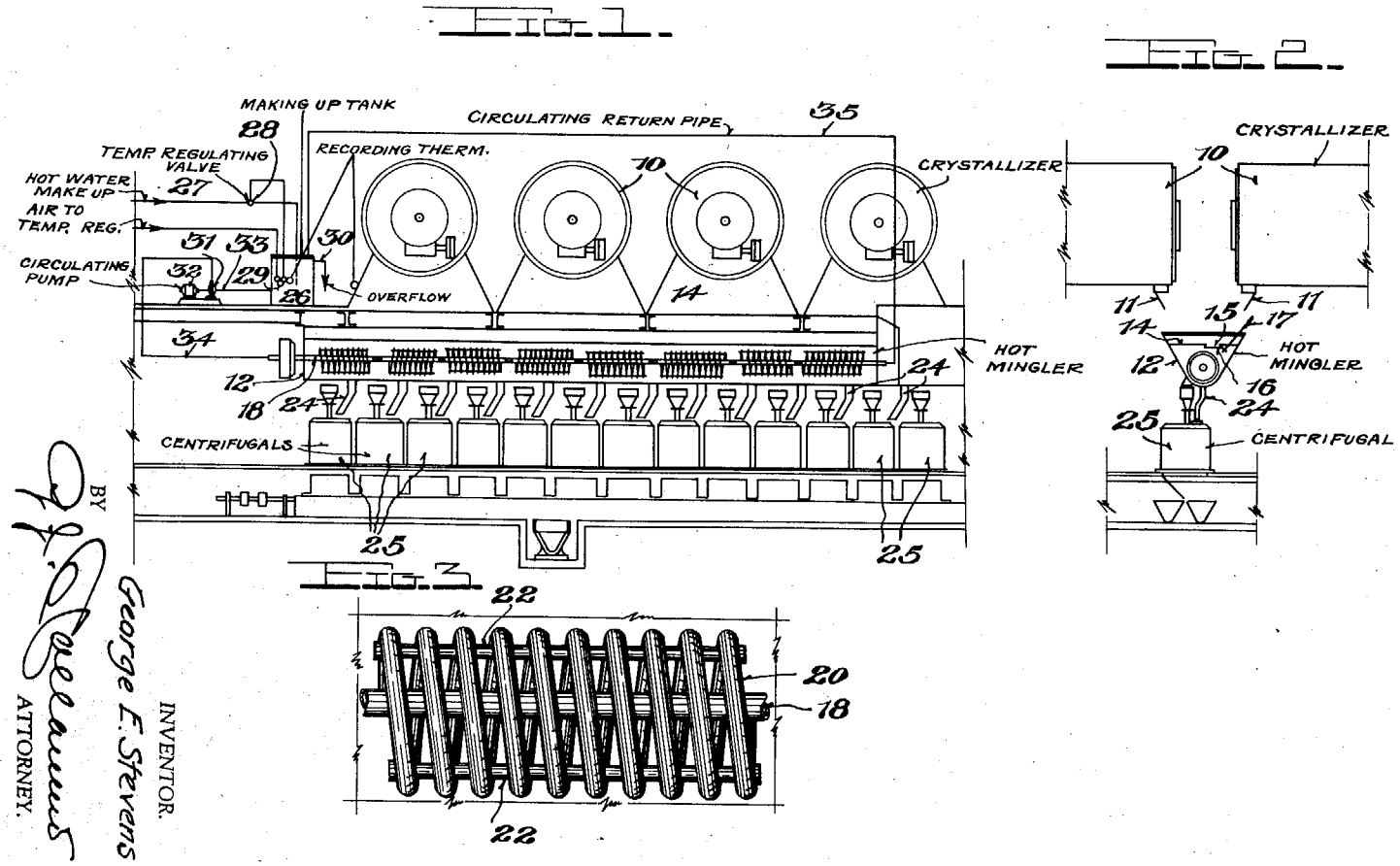
INVENTOR.
George E. Stevens
BY
ATTORNEY.

Nov. 16, 1937. G. E. STEVENS Re. 20,556
PROCESS FOR TREATING MASSECUITE
Original Filed May 12, 1934 2 Sheets-Sheet 2
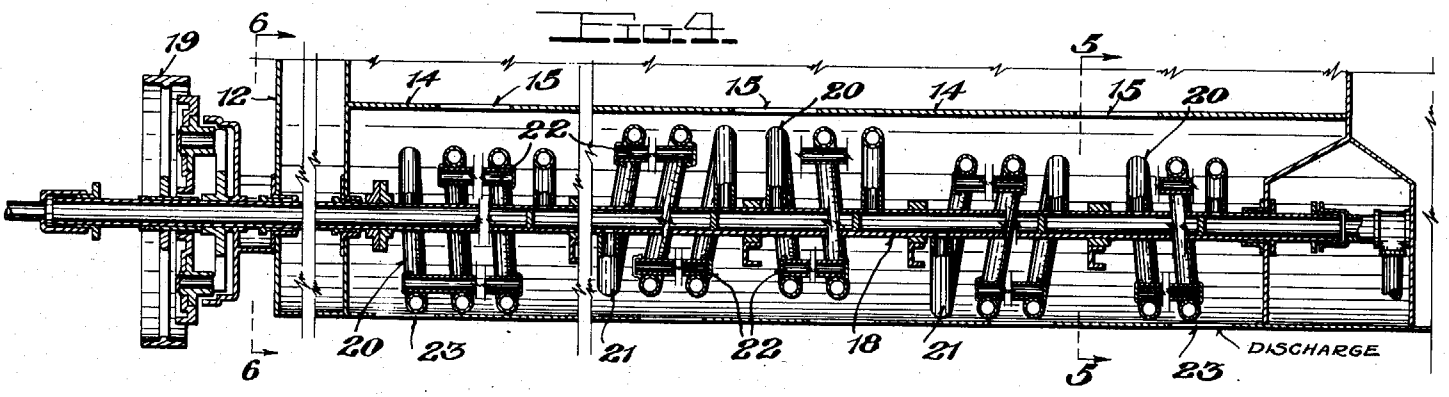
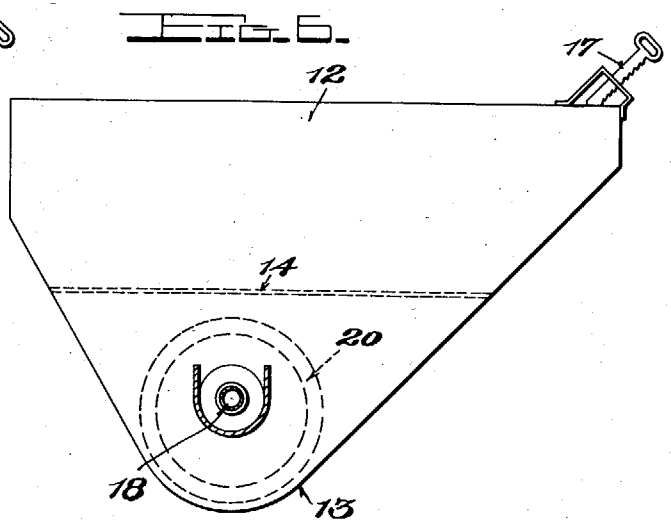
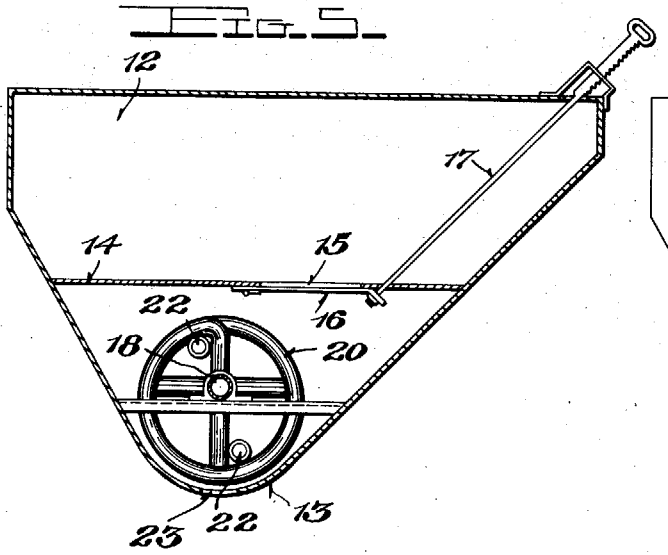
INVENTOR.
George E. Stevens
BY
ATTORNEY.

Reissued Nov. 16, 1937

Re. 20,556

UNITED STATES PATENT OFFICE 20,556

PROCESS FOR TREATING MASSECUITE

George E. Stevens, Denver, Colo., assignor to Western States Machine Company, Salt Lake City, Utah, a corporation of Utah Original No. 2,055,778, dated September 29, 1936, Serial No. 725,404, May 12, 1934. Application for reissue January 13, 1937, Serial No. 120,408

8 Claims. (Cl. 127—56)

The present invention relates to the manufacture of sugar and is intended to provide improvements in that art that will result in increasing the yield of sugar recovered from the massecuite or magma, cut down waste and facilitate effective centrifuging thereof by suitable and uniform conditioning of the massecuite or magma preparatory to the centrifuging while shortening the centrifuging operation and avoiding the imposition of additional burdens upon the equipment used in the sugar mill.

This application is in part a continuance of my copending application, Serial No. 602,621, filed April 1, 1932; a divisional application, Serial No. 756,003, filed December 4, 1934, contains claims that are restricted to improvements in the apparatus as distinguished from the present application which is limited to the novel process.

In the manufacture of white sugar, after preliminary processing by melting, concentrating, etc., the massecuite comprising the sugar grains in their mother liquor is delivered to the white sugar centrifugals in order to separate the mother liquor and the wash liquor from the solid crystals by centrifugal extraction. From these centrifugals are produced, first, the high grade white sugar and, second, the extracted liquor still containing a very substantial sugar content whose recovery is a very important item in sugar manufacture. Obviously any practical improvement, that will increase the percentage of high grade sugar recovered in the first instance and will also increase the percentage of recovery of the sugar content in the expelled liquors, will be of great advantage in lowering costs. When by similar treatment the processing of the low grade product can be expedited and cheapened without increasing the burden on the equipment required for the treatment of the low grade material, referred to as the "raw side" of the factory, still greater advantages will be obtained since the recovery of sugar on the raw side is more difficult and requires the use of many more centrifugals than on the white side and therefore it is the raw side treatment that constitutes the "neck of the bottle" which limits the capacity of the refinery.

The present invention deals with these problems and provides a new method of treatment which may be used in both cane sugar or beet sugar manufacture to increase, on the one hand, the percentage of recovery of high grade sugar on the white side and, second, the percentage of low grade sugar recovery on the raw side. Since recovery on the raw side has presented the greater obstacles to efficient and economical operation of the whole plant, I will particularly describe in detail the application of this new process to the raw side of the sugar mill, it being understood that this method may also be applied to treatment of high grade massecuite, or to massecuites or magmas comprising mixtures of sugar crystals and syrup of any grade.

After low grade sugar-containing liquors have been concentrated to a thick syrup by boiling in vacuum pans, this syrup is delivered to crystallizers at a temperature about 60°–70° centrigrade for the purpose of precipitating the sugar, held in solution, as crystals or grains as nearly as practicable of uniform size. To effect such precipitation in the desired form the material is gradually cooled by stirring it in a cylindrical drum called a crystallizer, whose axis is substantially horizontal and which is usually provided with a cooling water jacket. The stirring and cooling continues for a period of 40–60 hours, during which the temperature of the mass is reduced to approximately 30° to 35° C. It has been proposed to expedite the cooling by mingling a cooling liquid, such as water or molasses, to prevent the massecuite from becoming too stiff or viscous, but this is likely to redissolve a part of the crystals, which is of course objectionable. However, the lower the massecuite is cooled to produce the maximum percentage of crystallization, the stiffer it becomes and the more unfit for centrifuging when the massecuite is passed to the mixing trough of the centrifugal apparatus.

Therefore it has been proposed to add hot liquid, preferably hot low grade molasses, either by mixing it with the massecuite in the mixer or by mingling a stream of hot molasses with the stream of massecuite flowing from the mixer trough into the centrifugals. In practice, however, this has been found to be very unsatisfactory since the volume of molasses required to render the massecuite sufficiently fluent for effective centrifuging adds very greatly to the mass of material to be handled by the centrifugals and necessitates the installation and operation of additional centrifugals at much increase of expense; moreover, it redissolves a very considerable part of the solid sugar which has been crystallized at much expense and yields a smaller recovery of sugar from the centrifugals and causes a correspondingly increased waste of sugar in the final molasses, besides adding greatly to the bulk of the molasses with consequent increase of freight charges for delivering it to consumers who use it for cattle feed and other purposes.

Although it has been proposed to provide the bottom of the mixer trough with a hot water jacket, the only practical effect of this has been to prevent further chilling of the massecuite in the mixer trough, since if the temperature of the bottom of the trough should be high enough to heat the body of massecuite on the point of being delivered to the centrifugals, that portion of the massecuite in contact with the hot bottom would be decomposed, burnt or caramelized and other portions would be remelted, all of which would be fatal to success.

The present invention solves these difficulties by a method of treatment that allows the full maximum of cooling and precipitation of sugar grains in the crystallizer and which properly conditions the massecuite in the mixing trough of the centrifugal apparatus by a method of reheating that, within the short time permitted, renders the colloidal content of the massecuite sufficiently fluent to fit it for effective centrifuging without injury to, or deterioration of, the sugar grains and without causing caramelization or decomposition of the sugar grains and which also adds nothing to the bulk of material that must be handled by the centrifugals. In short, this improvement in the art, as applied to low grade massecuites, consists in conditioning partly cooled massecuite for centrifuging by transferring to all portions of the body of massecuite being so conditioned a dry heat of proper volume and temperature to render the colloidal content properly fluent for centrifuging within the requisite limit of time, while maintaining the temperature below the point that would injuriously affect the sugar crystals by decomposing or caramelizing the same.

In its application to high grade massecuites and to magmas prepared by mixing raw sugar with so-called "affination" syrup, the present invention enables the maintenance of uniform controlled temperatures throughout the mass of material undergoing treatment immediately prior to introduction into the centrifugals, thus preventing the growth of colloidal constituents and deleterious bacteria, assuring maximum and uniform fluidity, and facilitating efficient separation in the centrifugals.

These and other features of the invention will be particularly described in the following specification and will be defined in the claims hereto annexed.

The present invention is described in connection with the accompanying drawings which are illustrative of apparatus suitable for practicing the invention and in which, Figure 1 is a diagrammatic side elevation of the viscosity reducing system for use in the treatment of low grade massecuites, including crystallizers, hot minglers and centrifugals.

Figure 2 is a diagrammatic end view thereof.

Figure 3 is a side view of the spiral coil of a hot mingler, the coil functioning as the heating element for reducing the viscosity of the massecuite.

Figure 4 is a vertical cross sectional view of a hot mingler tank.

Figure 5 is a vertical cross section taken on line 5—5 of Figure 4; and

Figure 6 is a side elevational view partly in cross section, the latter being taken on line 6—6 of Figure 4.

The apparatus illustrated in the drawings comprises a series of crystallizers 10 provided with outlets 11. Positioned adjacent the crystallizers is a hot mingler tank 12, the lower portion of which is in the form of a convergent bottom trough 13. Extending transversely of the hot mingler 12 is a deck 14 provided with discharge openings 15 adapted to be closed by gates 16 which have fixed thereto operating levers 17.

Extending through the tank 12 is a hollow shaft 18 carrying a pulley 19 adapted to rotate the shaft. Spiral coils 20 and 21 eccentrically placed on said shaft are in fluid communication therewith, it being noted that the coils are staggered as to their direction of winding, the coils 20 winding to the left and the coils 21 to the right. This staggering of the coils prevents the flow of massecuite to one end of the mingler tank only. Positioned inside of the coils are conduits 22 in operative connection with the source of heating fluid, these pipes functioning to increase the operative heating surface, add to the agitative action of the heating coils and serve as bracing elements therefor. The tank 12 is provided with discharge openings 23 and conduits 24 leading to the centrifugals 25.

The circulation system for the above apparatus comprises a tank 26 which receives boiling water from a conveniently located boiler by means of a conduit 27. A temperature regulator 29 thermostatically adjusts a valve 28 and thereby regulates the supply of hot water to the make-up tank 26 in accordance with a predetermined temperature of the water in the tank. The tank 26 is provided with an overflow outlet 30.

The water in the make-up tank 26 is circulated through the heating coils 20 and 21 by means of a duplex pump 31 in operative connection with a motor 32. The water is drawn from the make-up tank 26 through the pipe 33 and then passes by means of the conduit 34 to the hollow shaft 18. After circulating through the coils the water returns to the make-up tank 26 by means of the return conduit 35.

In treating low grade massecuite according to the present invention the massecuite is dropped from the crystallizers 10 onto the deck 14 of the hot mingler tank 12 and is fed into the mingler through the openings 15 adapted to be closed by gates 16 operated by levers 17. The massecuite in the hot mingler is subjected to the moving heating surface of the coils 20 and 21. Since one of the dominant objects of the present invention is to reduce the viscosity of the massecuite without dissolving any appreciable amount of sugar the time during which the massecuite is subjected to the action of the moving coils and the temperature to which the massecuite is heated must be carefully controlled. The area of the moving heating surface is taken as a constant and then the time factor is adjusted, depending upon the temperature of the massecuite entering the hot mingler tank, the density of the massecuite, the rate of movement of the heating surface and the temperature of the circulating medium. The present invention departs from the prior art in providing for a relatively large heating surface, preferably a moving heating surface, and while it is not desired to be limited to any specific ratio of heating surface to volume of massecuite, satisfactory results are obtained when there is provided one square foot of moving heating surface per cubic foot of massecuite when there is a relatively low temperature difference between the heating medium and the massecuite. In other words, the ratio of heating surface to volume of massecuite must be adjusted together with the temperature difference so that the massecuite can pass through the hot mingler tank in a relatively short time in order to prevent the redissolving of sugar in the mother liquor or to reduce this to a minimum, while at the same time reducing the viscosity of the massecuite to a point where it can be readily spun in the centrifugals.

In accordance with the present invention there is employed a heating medium at a temperature only slightly higher than the final temperature of the heated massecuite. Although water is the preferred heating medium other liquids may be used. When treating low grade massecuites it is of considerable importance to use a heating surface having a temperature from 50° to 65° C. or slightly higher than the heated massecuite, since temperatures of 45° C. to 55° C. are the highest the massecuite can be reheated without dissolving a small portion of the sugar crystals. A continuous moving contact with the heating surfaces produces a rapid increase in temperature.

In order to obtain maximum crystallization, the massecuite in the crystallizer is lowered to a temperature, averaging between 25° C. and 30° C., or lower if possible, although the temperatures and temperature range are not critical and a wider temperature range may be employed.

The heating coils 20 and 21 are preferably maintained at a temperature varying between 50° C. and 60° C., when the temperature of the massecuite entering the hot mingler tank 12 is about 30° C. The massecuite under these conditions is heated to a temperature varying between 40° and 50° C. The process may also be carried out so that the temperature of the massecuite entering the centrifugals 25 varies between 35° and 40° C.

Under the conditions above set forth, it takes approximately one and five-tenths seconds to raise the temperature of 100 pounds of massecuite 1° C., and approximately twenty-two seconds to raise 100 pounds of massecuite 15° C., or a range of five to ten minutes to raise one ton of massecuite 15° C. The time factor depends upon the temperature of the massecuite entering the hot mingler tank 12, the density of the massecuite, the temperature of the circulating water and the square feet of effective heating surface, the latter obviously varying according to the exposed area of the heating surface and its rate of movement.

The above clearly brings out one of the important points of the present invention, namely, that the massecuite is heated in a relatively short time and by a low temperature heating medium, the short time of heating greatly reducing the viscosity of the massecuite and greatly increasing the raw side capacity of the factory, while at the same time ensuring that little or a minimum amount of sugar is redissolved. The redissolution of the sugar is also prevented or reduced to a minimum by the low temperature employed, it having been previously pointed out that at temperatures above 65° C. to 70° C. an appreciable amount of the crystals of the massecuite are dissolved in the mother liquor. Long heating even at 60° to 65° C. redissolves considerable sugar, and therefore merely reducing the temperature, although helpful, will not produce the desired result. There must be a relatively large heating surface in relation to the volume of the massecuite, this heating surface in the preferred form of the invention being an agitating and moving surface in order that even at low temperatures, the viscosity of the massecuite be reduced quickly so that no appreciable amount of sugar will be redissolved. With the reduction in viscosity the massecuite can be readily spun with at least fifteen to twenty per cent increase in centrifugal capacity, made possible through more efficient purging of the sugar crystals and the greater ease with which a massecuite or magma of uniform and low viscosity may be centrifuged.

The above clearly brings out that there is a correlation of three factors—namely, the time factor, the ratio of moving heating surface to the volume of massecuite in contact with the heating surface, and a low temperature difference between the reheated massecuite and the heating medium.

The hot mingling process herein disclosed comprises exposing the massecuite, at a point just before introduction into centrifugals, to movement relative to a large heating surface, preferably a moving heating surface presenting at least one square foot of moving surface per cubic foot of massecuite being treated at a time, while employing a low temperature difference between the heating medium and the massecuite initially fed thereto, the maximum temperature difference being preferably 30° C. and the minimum 15° C. when treating low grade massecuite, although these figures may be somewhat departed from in either direction and still come within the spirit of the invention. The steps above set forth result in a speedy heating cycle, taking from five to ten minutes.

In actual operation, 124,360 pounds of heating fluid at a temperature of 60° C. were required per hour to transmit the necessary heat to the massecuite. Stated differently, approximately 450,000 B. t. u. per hour were required to heat 30,000 pounds of massecuite passing through the hot mingler tank per hour. Using water at a temperature of 60° C., 1,040 B. t. u. were required per square foot of moving heating surface. 40 B. t. u. per degree difference in temperature per square foot of heating surface per hour gave satisfactory results.

When the crystallizers 10 are ready to drop, the auxiliary mechanism of the system is started and the temperature regulator 29 adjusted to 55° C. to 60° C. or other desired temperature. Hot water is then circulated through the system, including the coils 20 and 21, until the system is well heated. The crystallizer 10 is then opened and the massecuite is allowed to flow onto the deck 14 in the hot mingler tank 12. After the deck 14 is well covered, all the gates 16 are opened a notch or two and the massecuite is distributed over the circulating coils 20 and 21. The massecuite is allowed to flow until the entire system is covered. The gates 16 are then closed and the entire massecuite below the deck heated to 45°–50° C. and the massecuite now becomes a heating medium as well as the rotating coil system. The object of filling the mingler tank below the deck and then shutting the gates is to heat the massecuite body around the coils to 40°–50° C., so that this massecuite body will also act as a heating medium after the deck gates are again opened as mentioned in the following paragraph.

When spinning is started the gates 16 are opened and massecuite is distributed evenly along the entire system and the inflow regulated to equal the drawing off of the hot massecuite. This is merely a preferred procedure, but is desirable as the best operating conditions are attained by maintaining a constant level of massecuite above the heating coils. Experience is the best teacher in a regulation of this character, but it may be mentioned that at all times the gates 16 should be adjusted to get as even distribution and introduction of cold massecuite as possible throughout the entire system, otherwise there will be a tendency for the production of massecuite of uneven temperature which will result in variation of spinning qualities.

It is desired to point out that in accordance with the present invention more than one crystallizer can be dropped at one time. The general mixing of the massecuite from several crystallizers in order to keep up capacity will do no particular harm as the reheating will overcome any great difference that may be present in the quality of the various massecuites. This system may be necessary when one of the crystallizers is on the ground floor of the plant and part of the massecuite has to be pumped.

The location of the heating coils 20 and 21 depends on the location of the crystallizers 10 with respect to the hot mingler tank 12 and the centrifugal 25. If all the crystallizers 10 are above the hot mingler tank 12, or as it is otherwise known the mixer, and the centrifugals 25, the complete installations of the coils 20 and 21 is made in the mixer or hot mingler tank 12.

When there are crystallizers both above and below the centrifugal station and the greater portion of the crystallizer capacity is above the centrifugal station, the reheating system should be installed in the mixer tank above the centrifugals and the small volume of the massecuite below the centrifugal station pumped as heavy as possible, and introduced near the middle of the upper mixer and allowed to mix with the massecuite from the upper crystallizers. The pumping should be regulated so that the massecuite flow onto the deck of the hot mingler is in the same ratio as the amount of massecuite in the crystallizers above and below the centrifugals, if continuous uniformity is desired.

If the raw sugar produced in accordance with the invention is to be washed to produce exceptional high purity low raw sugar, less water will be required than by the prior art method as the sugar produced in accordance with the present invention does not back on the screen but remains more or less fluffy in some sort of a cornmeal consistency, and the water penetration is considerably greater than when cold massecuite is spun.

The present invention, while specifically applicable to treatment of the massecuite from "high green" syrup, is also applicable to treatment of the massecuite from higher purity syrup such as "High raws" and "White massecuite". This massecuite syrup is boiled in a vacuum pan until it becomes supersaturated, when sugar starts crystallizing. After the syrup in the pan has reached the desired concentration of dry substance it is dropped into the crystallizer if it is a "High raw" massecuite, where it is cooled. Thereafter this syrup is introduced into the hot mingler and its viscosity reduced in accordance with the basic process and variations thereof as herein disclosed. In the case of white massecuite that goes direct to the white mixer, the hot mingler can be used to maintain the temperature of the massecuite at approximately the same point as in the vacuum pan. The invention permits white massecuite to be boiled to high density in the vacuum pans, since the hot mingling of this material as described herein prevents cooling prior to introduction into the centrifugals, keeps the massecuite thoroughly mixed and highly fluid and prevents caking in the mixer. As in the case of low grade massecuites, the yield of sugar crystals is greatly increased.

In the preferred form of the present invention, there is no increase in the volume of the massecuite after it leaves the pan and before centrifugalization. In other words, there is no dilution with molasses or water. It is desired to point out that the massecuite moves through the rotating coils 20 and 21 on its passage from the inlet to the outlet of the system and the coils move through the massecuite by rotation. This is what may be termed a duplex action.

The hot mingler process herein set forth permits the boiling of lower purity pans as lower purity massecuite is more easily worked by the hot mingling process. With the old method of water dilution, or any other diluting material, such as hot syrup or molasses, more volume of these diluting materials are required to put the low purity massecuite in a position to be spun.

The following is an example of actual factory operation in the processing of low grade massecuite.

The "green syrup" is boiled in a vacuum pan until it reaches a certain dry substance or sugar concentration commonly called supersaturation at which point fine grains or crystals are formed. The massecuite is boiled to a dry substance concentration and at a purity, such that after it is dropped to the crystallizer it will not need any or very little water addition during the cooling period.

At the factory where this embodiment of the process is practiced, the pans are dropped to the crystallizer at 90% dry substance and 74 purity with none or very little water added to the crystallizer during the entire campaign. The massecuite is dropped from the pan to the crystallizer at the lowest possible temperature, 60° C. being about as low a temperature as can be obtained and one that is recommended. The object of dropping the pan at 60° C. is to put less load on the crystallizer and to shorten the cooling period, or in other words to cool the crystallizers at a faster rate and obtain maximum crystallization in the shortest possible time.

After the pan is dropped into the crystallizer, which is water jacketed and has a helix in it moving at the rate of about one revolution every four minutes, the massecuite is cooled as quickly as possible by circulation of cold water, cold as can be obtained, through the water jacket and aided by very slow agitation of the massecuite by the moving helix.

The average crystallizer holds approximately 1100 to 1200 cubic feet of massecuite or between 100,000 and 108,000 pounds. The average crystallizer holding around 1200 cubic feet is 20 to 22 feet in length and between 8 and 9 feet in diameter, and has a water jacket through which cold water is circulated. A helix mounted on a center shaft rotates on the average of one revolution every 4 minutes and it takes 40 to 60 hours to cool the massecuite in the crystallizer down to the lowest temperature factory conditions permit. It is quite obvious that if it were attempted to reheat the massecuite in the crystallizer by passing hot water through the water jacket and using an agitator, such as the helix, which revolves one revolution every four minutes, that it would be a matter of hours to reheat the massecuite to 40°–50° C. and localized overheating would result and much sugar be redissolved. Such a procedure is absolutely impractical.

It takes at least 40 hours to cool the massecuite from 60° C. to 30° C. The object of cooling the massecuite is to allow crystal growth, for as the temperature drops the supersaturation increases and equilibrium is reached when the saturation of the mother liquor reaches the point where approximately 7 pounds of non-sugars are in solution with 10 pounds of sugar; in other words, approximately 7 pounds of non-sugars keep 10 pounds of sugar from crystallizing. The lower the massecuite is cooled the closer the desired end is approached.

When the massecuite in the crystallizer has been cooled as low as operating conditions permit, it is dropped onto the deck of the hot mingler and fed through the gates into the mingler heating system where it mixes with the massecuite previously heated and comes in contact with the moving heating surface where it becomes a homogeneous mixture of sugar crystals and mother liquor of uniform and definite temperature. The temperature of the massecuite is definitely regulated and controlled by the temperature control regulator on the hot water circulating tank. If the raw side is not crowded the massecuite is usually heated to around 45° C., but if capacity is needed the temperature is raised to 50° C. or even higher. It is one of the advantages of the hot mingler that it is flexible and can be quickly regulated to meet conditions.

This factory's last campaign had an average of 44 crystallizer hours, which is about average. The massecuite was cooled to 30° C. and reheated to 44° C. using an average water temperature in the mingler system of 57° C. In other words, at this factory's last campaign it took an average of 44 hours to lower each 1150 cubic feet or 107,000 pounds of massecuite, 1150 cubic feet average per crystallizer, from a temperature of 60° C. to 30° C. This factory spun 22,379 tons of raw massecuite in 66.65 slicing dates or an average of 335.8 tons per day or approximately 14 tons per hour.

After the hot mingler had been filled with massecuite at the start of campaign and the massecuite heated to the desired temperature, 44° C. in this case, the operation became continuous for the massecuite flowed through the gates in the deck of the mingler as fast as it was drawn off into the centrifugals, so that the operation was continuous. The reheated massecuite drawn off was replaced by cold massecuite so that by the time it reached the outlets or goose necks of the centrifugals it had been raised from 30° C. to 44° C. and in the average time of about 7 minutes, or the average time of one spinning cycle of the centrifugals.

Any delay is at the start of campaign when it is necessary to warm up the mechanism and the massecuite covering the coils, but after this is accomplished, which requires about 45 minutes, there is no more delay and the process becomes continuous with no delay in the flow of massecuite from the crystallizer onto the deck of the mingler, through the gate openings into the reheating system and then into the centrifugals, so that the average heating cycle for each centrifugal load is approximately 7 minutes, or under all conditions will range between 5 and 10 minutes.

At this factory's last campaign the average dry substance of the pans entering the crystallizer was 90.0 and the average dry substance leaving the crystallizer 89.8. This was for 22,379 tons of massecuite. This dilution with small amounts of cold water or steam out from the pans when the massecuite was dropped into the crystallizer was absolutely negligible from a dilution standpoint. There was no dilution of the 22,379 tons of massecuite after leaving the crystallizer, with water, molasses, or other diluting materials, and the per cent dry substance in the massecuite as spun was the same as that leaving the crystallizer. The density of the massecuite from the time it leaves the crystallizer, enters the hot mingler system and then the centrifugals is not changed; however, the fluidity is greatly changed. The massecuite runs very slowly and with great viscosity from the crystallizer, but after it passes through the reheating process or is treated in the hot mingler where its temperature has been raised around 15° C., it flows freely from the goose necks of the mingler into the centrifugals with fairly high fluidity. However, its density is the same as when it left the crystallizer and there has been no dilution or addition of any material except heat. Raw massecuite contains gums, colloids, etc., which upon cooling tend to jellify and become very viscous or semi-solid. Indirect heat has the property of breaking up this viscosity and liquefying them, much more so than the addition of cold water or hot syrups. It is in view of the physical properties of these gums and colloids that indirect heating, without dilution, is advantageous. Indirect heat has a tendency to liquefy the chilled gums and colloids more quickly and efficiently than any other medium.

Some additional advantages of the present invention are:

1. A heavier molasses is produced because of its smaller water content. Consequently the freight cost in shipping the same is reduced.

2. The invention allows the boiling of lower purity raw pan to obtain the lowest possible molasses purity. In other words, the viscosity of the so-called tough massecuite is more readily overcome.

3. The crystallizers can be cooled to a lower temperature than is possible with the prior art methods and this because the viscosity of the massecuite can be more rapidly overcome when the present invention is used and the sugar described by the old dilution method, used to break viscosity, can be saved.

I claim:

1. The improvement in the art of conditioning a mixture of sugar grains and syrup for efficient centrifuging which comprises subjecting successive portions of said mixture, for a period of only a few minutes and immediately before delivery for centrifuging, to the stirring action of heat-transferring means kept at a predetermined temperature by continuous circulation of hot water maintained at a predetermined temperature not harmfully in excess of the maximum temperature to which the material needs to be heated for reduction of its viscosity to a point suitable for efficient centrifuging, while maintaining circulation of the hot water at a volume and rate sufficient to impart to the portions of the material being so heated a uniform temperature throughout the run-off of the batch.

2. The improvement in the art of conditioning a mixture of sugar grains and syrup for centrifuging which comprises feeding the mixture in a regulated stream for delivery to centrifugals, imparting to that part of the moving stream adjacent to the point of delivery to the centrifugals, within the space of a few minutes, a dry heat sufficient to heat that portion of the material to a uniform temperature sufficient to render it fluent enough for efficient centrifuging by subjecting it to the stirring action of heat-transferring means maintained at a practically constant temperature by means of the circulation through it of hot water maintained at a temperature and volume sufficient to supply the appropriate volume of heat-transfer without substantial drop of temperature in the circulating hot water.

3. The improvement in the art of conditioning a mixture of sugar grains and syrup for efficient centrifuging which comprises subjecting successive portions of said mixture, for a period of only a few minutes and immediately before delivery for centrifuging, to the stirring action of heat-transferring means kept at a predetermined temperature by continuous circulation of a heating medium maintained at a predetermined temperature not harmfully in excess of the maximum temperature to which the material needs to be heated for reduction of its viscosity to a point suitable for efficient centrifuging, while maintaining circulation of the heating medium at a volume and rate sufficient to impart to the portions of the material being so heated a uniform temperature throughout the run-off of the batch.

4. The improvement in the art of conditioning a mixture of sugar grains and syrup for centrifuging which comprises feeding the mixture in a regulated stream for delivery to centrifugals, imparting to that part of the moving stream adjacent to the point of delivery to the centrifugals, within the space of a few minutes, a dry heat sufficient to heat that portion of the material to a uniform temperature sufficient to render it fluent enough for efficient centrifuging by subjecting it to the stirring action of heat-transferring means maintained at a practically constant temperature by means of the circulation through it of a heating medium maintained at a temperature and volume sufficient to supply the appropriate volume of heat-transfer without substantial drop of temperature in the circulating heating medium.

5. The process of treating a mass of sugar crystals and syrup to be centrifuged which comprises imparting to at least a portion of the mass a uniform high temperature and fluidity, at a point just before delivery into centrifugals, by intimately contacting and stirring the same with at least one square foot of moving heated surface for each cubic foot of material being stirred, which surface is maintained at a substantially uniform temperature somewhat but not more than 30° C. higher than the desired final temperature of the mass, and immediately centrifuging successive charges from the conditioned portions prior to substantial lowering of the temperature thereof.

6. In the processing of low grade sugar massecuites, the steps which comprise cooling the massecuite in a crystallizer to a low temperature at which it is highly viscous, flowing substantially the entire mass of cold viscous massecuite from the crystallizer into a mixing chamber adjacent centrifugals, stirring that portion of the massecuite in the lower portion of the mixing chamber and maintaining relative movement between such portions and, for each cubic foot thereof, at least one square foot of heated surface maintained at a substantially uniform temperature between 50° and 65° C., thereby raising the temperature of such portion to substantially a predetermined temperature between 35° and 55° C. and imparting thereto a uniform decreased viscosity within a period of only a few minutes, and immediately centrifuging charges from the portion so conditioned prior to substantial lowering of the temperature thereof.

7. The process of treating viscous mixtures of sugar crystals and syrup to be centrifuged which comprises introducing a large mass of such material into a mixing tank overlying a battery of centrifugal machines, establishing contact and relative movement between that portion of the mass adjacent the bottom of said tank and extensive heated surfaces distributed substantially uniformly in the space within the tank in the lower portion thereof and heated uniformly to a temperature not harmfully in excess of the maximum temperature at which the material needs to be kept for efficient centrifuging, maintaining such contact and relative movement to ensure uniformity of temperature and uniform high fluidity in said portion, withdrawing charges of the fluid heated material through the bottom of the tank and immediately centrifuging the same and replacing the withdrawn material by material from that portion of the mass above said heated surfaces.

8. In the processing of white sugar massecuites, the steps which comprise boiling syrup in a vacuum pan to produce a mass of white massecuite of the desired consistency, transferring the mass of massecuite to a mixer tank overlying centrifugal machines, maintaining the temperature and thereby the fluidity of the massecuite in the tank at approximately the same point as when leaving the vacuum pan by stirring the massecuite and maintaining intimate contact and relative movement between the same and extensive, uniformly heated surfaces located within the tank in the lower portion thereof and adjacent bottom outlets therein and maintained somewhat but not harmfully above the desired massecuite temperature, and withdrawing from the tank and immediately centrifuging successive charges of the massecuite so conditioned prior to substantial lowering of the temperature thereof.

GEORGE E. STEVENS.